April 29, 1941.  L. R. GRAY  2,239,959
COURSE CONVERTER FOR CONVEYANCES
Filed Jan. 25, 1939
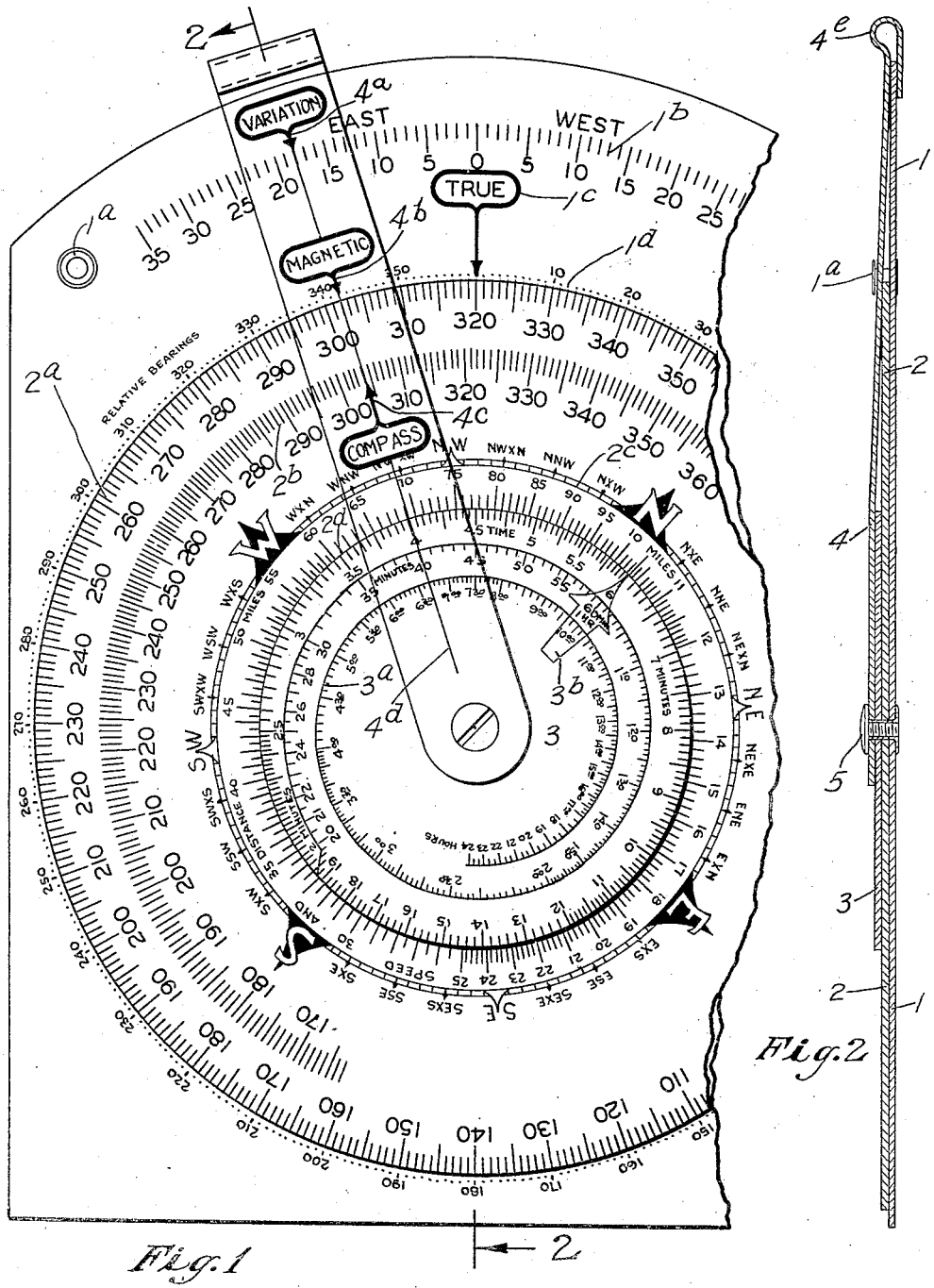
INVENTOR.
Lloyd R. Gray
BY A. B. Bowman
ATTORNEY.

Patented Apr. 29, 1941

2,239,959

UNITED STATES PATENT OFFICE 2,239,959

COURSE CONVERTER FOR CONVEYANCES

Lloyd R. Gray, San Diego, Calif.

Application January 25, 1939, Serial No. 252,797

3 Claims. (Cl. 235—83)

My invention relates to a course converter or corrector for conveyance such as ships, aircraft or the like and the objects of my invention are:

First, to provide an apparatus of this class that readily determines the compass course to be steered without reference to deviation tables;

Second, to provide an apparatus of this class which from a known compass course determines the true course without reference to deviation tables;

Third, to provide an apparatus of this class which by means of accurately divided compass graduations printed on the disks for the individual ships compass, compass courses are determined by direct readings without additions or subtractions or bothersome interpolations or references to deviation tables;

Fourth, to provide an apparatus of this class by which relative bearings of objects of celestial bodies are converted to true bearings in a single setting without addition or subtraction;

Fifth, to provide an apparatus of this class by which magnetic courses in point and quarter point are readily selected;

Sixth, to provide an apparatus of this class which performs all of the time speed distance calculations without reference to tables or the use of pencil;

Seventh, to provide an apparatus of this class in which the time disk is unique in that all times from two minutes to twenty-four hours are arranged thereon;

Eighth, to provide an apparatus of this class in which all divisions found on the time spiral of the time disk are duplicated on its outer edge, thus permitting transfer by inspection of any interior divisions to the edge;

Ninth, to provide an apparatus of this class which is very simple and economical of construction, easy to operate, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a front elevational view of my course converter for conveyances showing a fragmentary portion broken away at one side and Fig. 2 is a transverse sectional view taken from the line 2—2 of Fig. 1.

Similar characters of reference refer to similar parts and portions in the different views of the drawing.

The base member 1, stop members 1a, east and west degree scale 1b, true index pointer 1c, bearing calculation degree scale 1d, large revoluble disk 2, true and magnetic course degree scale 2a, particular ship degree scale 2b, point and quarter scale 2c, circular slide rule scale for the time speed distance computer 2d, time computing disk 3, spiral time computing scale 3a, arm member 4, variation index pointer 4a, magnetic index pointer 4b, compass index pointer 4c and fine radial reference line 4d constitute the principal parts and portions of my course converter for conveyances.

The base member 1 consists preferably of an opaque sheet of white Celluloid with a circular top portion and with straight sides and bottom as shown best in Fig. 1 of the drawing. It is provided at upper corners at opposite sides with stop members 1a which are in the form of eyelets and form the stops for the arm member 4. It is provided in alignment with these stop members 1a with east and west degree scale 1b graduated from the center in opposite directions up to 35°. It is also provided inwardly of the degree scale 1b and at the center with a true index pointer 1c in the form of an oblong loop with a centrally extending portion with a pointer at the end and substantially in line with the extended end of the pointer is the bearing calculation degree scale 1d which is a full concentric scale of 360°.

Revolubly mounted in superposed relation on the base member 1, is a large revoluble disk 2 with its periphery just inside of the bearing calculation degree scale 1d and positioned at the periphery of this disk 2 is the magnetic and true course degree scale 2a. Positioned just inwardly of this scale 2a from which magnetic courses are read is the particular ship degree scale 2b from which compass courses are read, and which it will be noted is provided with variable spaces due to making due allowance for the compass deviation in relation to scale 2b indicative of the particular ship on which the course converter is used, and it will be here noted that this is a particular part of this invention—the particular compass degree scale for the particular ship upon which it is used being variable in the scale markings to provide definite scale for the particular ship making due allowance for the deviation of the compass in all headings. Inwardly some distance from this particular ship degree scale on the disk 2 is point and quarter point scale 2c which is provided with four large points indicating north, south, east and west and between these are small points indicating northeast, southeast, and northwest. Then inwardly of this point and quarter point scale 2c is the circular slide rule scale 2d for the time speed distance computer.

Positioned in interposed revoluble relation on the large disk 2 is the time computing disk 3 concentric therewith. This disk 3 is provided with a spiral and straight time computing scale and with an arrow pointer 3b.

Pivotally mounted concentrically with the disks 2 and 3 by means of a conventional connector 5 is the arm member 4 which is preferably transparent and extends outwardly to past the upper edge of the base member 1 and is provided with a loop portion 4e with its extended end extending over the opposite side of the upper edge of the base member 1 as shown best in Fig. 2 of the drawing so that the arm member 4 is held in contiguous relation with the upper surfaces of the members 1, 2 and 3 and is adapted to shift thereon. It is, however, confined to the shifting relative to the member 1 by the stop members 1a at each side which engage the side edges of the arm member 4 when the center of the arm member 1 is in the position of 35° at either side, east or west. The top member on the west side is not shown.

Positioned on the arm member 4 contiguous with the east or west degree scale 1b on the base member 1 is a variation index pointer 4a which is a loop member provided with a pointer with its extremity positioned in substantial alignment with the east and west degree scale 1b and positioned inwardly therefrom some distance is the magnetic index pointer 4b which is loop shaped and provided with a pointer which extends to the periphery on the disk 2 and to the magnetic and true course degree scale 2a. Positioned inwardly on this arm 4 is the compass index pointer 4c which is provided with a pointer directed outwardly toward the particular ship degree scale 2b on the disk 2 and positioned centrally and longitudinally of the arm member 4 is a fine radial reference line 4d which extends the full length of said arm.

The operation of my true course converter is substantially as follows: To find the compass course. On the chart in use draw a straight line from your position to the point of destination. The direction of this line with respect to the meridian is the true course. Determine it by means of a course protractor or by transferring the line to the nearest compass rose by means of parallel rulers. Next, from the converter apparatus select the variation to be used and set the arm 4 with its middle line 4d to this value. Then rotate the disk 2 until the true course is read at the true index point. The compass index pointer 4c will then point to the compass course to be steered and the magnetic index pointer will point to the magnetic course.

To find the true course when this compass course is given, the above steps are reversed.

To find true bearing of an object we note its relative bearing and at the same time note the ships heading per compass. The true bearing may be found by adding the relative bearing to the ship's heading after applying both variation and deviation. This problem is simply solved on this apparatus. Set the arm 4 to the variation and the disk 2 to the compass course at the time of observation. The relative bearing scale is the index 1d just outside of the periphery of the disk 2. Locate the observed relative bearing and adjacent to this on the disk, read the required true bearing. For computing time, speed and distance, we use principally the disk 3 together with the scale 2d on the disk 2 which is an adaptation of a circular slide rule particularly designed for time, speed and distance calculations, and it will be noted that this disk 3 carries all times from 2 minutes found at the outside end of the spiral to a maximum of 24 hours found at the inside end and it will be noted that each graduation on the spiral is duplicated radially on the edge of this disk 3, thus any reading on the spiral can be projected to the edge by eye for comparison purposes. The speed and distance scales 2d is on the disk 2 and on it will be read the speed as indicated by the arrow 3b on the disk 3, placing a decimal point whenever appropriate. Distances are likewise read from the speed and distance scale placing a decimal as needed.

To find the distance run when the speed and time are known, turn the disk 3 until the arrow 3b indicates the known speed. Then opposite the time on the disk 3 will be read the distance on the speed and distance scale on the disk 2.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a course converter for conveyances of the class described, the combination of a disk member provided with a special particular ship corrected variable degree compass scale consisting of three hundred and sixty unequally spaced divisions positioned concentric with said disk, an arm member pivotally mounted concentric with said disk provided with a compass index indicator arranged to pass in contiguous relation with said scale, a magnetic and true course degree scale consisting of three hundred and sixty equally spaced divisions on said disk concentric with said special particular ship corrected variable degree compass scale, said arm member also having a magnetic index indicator arranged in relation with said magnetic and true course degree scale and arranged in relation therewith for comparison between the special particular ship corrected variable degree compass scale and the magnetic and true course degree scale.

2. In a course converter for conveyances of the class described, the combination of a disk member provided with a special particular ship variable degree scale consisting of three hundred and sixty unequally spaced divisions positioned concentric with said disk, an arm member pivotally mounted concentric with said disk provided with a compass index indicator arranged to pass in contiguous relation with said scale, a regular degree scale consisting of three hundred and sixty equally spaced divisions on the periphery of said disk outwardly of said special particular ship variable degree scale and another index indicator on said arm member arranged in contiguous relation with said regular degree scale arm in radial alignment with said compass index indicator for comparison between said special particular ships variable degree scale and the regular degree scale with the movement of said arm member over said disk.

3. In a course converter for conveyances of the class described, the combination of a scale retaining member provided with a special particular ship variable degree scale consisting of three hundred and sixty unequally spaced divisions on said scale retaining member, said scale retaining member provided with a true course degree scale consisting of three hundred and sixty equally spaced divisions adjacent said particular ship variable degree scale and an arm pivotally mounted relatively with said scale retaining member provided with an index indicator means arranged to correlate both of said scales.

LLOYD R. GRAY.